(12) United States Patent
Henry

(10) Patent No.: US 9,482,374 B2
(45) Date of Patent: Nov. 1, 2016

(54) SEAL HAVING PROJECTIONS AND COUPLING HAVING POCKETS

(75) Inventor: Vance W. Henry, Easton, PA (US)

(73) Assignee: Victaulic Company, Easton, PA (US)

( * ) Notice: Subject to any disclaimer, the term of this patent is extended or adjusted under 35 U.S.C. 154(b) by 1205 days.

(21) Appl. No.: 12/561,789

(22) Filed: Sep. 17, 2009

(65) Prior Publication Data

US 2011/0062706 A1 Mar. 17, 2011

(51) Int. Cl.
*F16L 17/04* (2006.01)
*F16L 17/03* (2006.01)
*F16L 21/02* (2006.01)

(52) U.S. Cl.
CPC ............. *F16L 17/04* (2013.01); *F16L 17/032* (2013.01); *F16L 21/022* (2013.01)

(58) Field of Classification Search
USPC ............ 285/38, 88, 111, 112, 364–367, 409, 285/420, 910
See application file for complete search history.

(56) References Cited

U.S. PATENT DOCUMENTS

| 3,362,730 | A |  | 1/1968 | St. Clair et al. |
| 3,664,691 | A | * | 5/1972 | Nakamura .................... 277/615 |
| 7,086,131 | B2 |  | 8/2006 | Gibb et al. |
| 7,401,819 | B2 | * | 7/2008 | Gibb et al. .................... 285/373 |
| 7,712,796 | B2 |  | 5/2010 | Gibb et al. |
| 2006/0175829 | A1 | * | 8/2006 | Kaimer et al. ................ 285/256 |

* cited by examiner

*Primary Examiner* — Daniel P Stodola
*Assistant Examiner* — Zachary Dragicevich
(74) *Attorney, Agent, or Firm* — Ballard Spahr, LLP

(57) ABSTRACT

A ring-shaped seal has projections on an outwardly facing surface in the form of tubes which have a longitudinal axis oriented perpendicular to a plane containing the ring. The seal is received within a channel defined by segments attached end to end forming a coupling for coupling pipe elements in end to end relation. The segments have pockets which receive the projections. The projections support the segments in spaced apart relation to allow the pipe elements to be inserted into the coupling without loosening or disassembling it. The projections deform when the segments are drawn toward one another by adjustably tightenable fasteners and allow the segments to engage and capture the pipe elements in end to end relation.

20 Claims, 6 Drawing Sheets

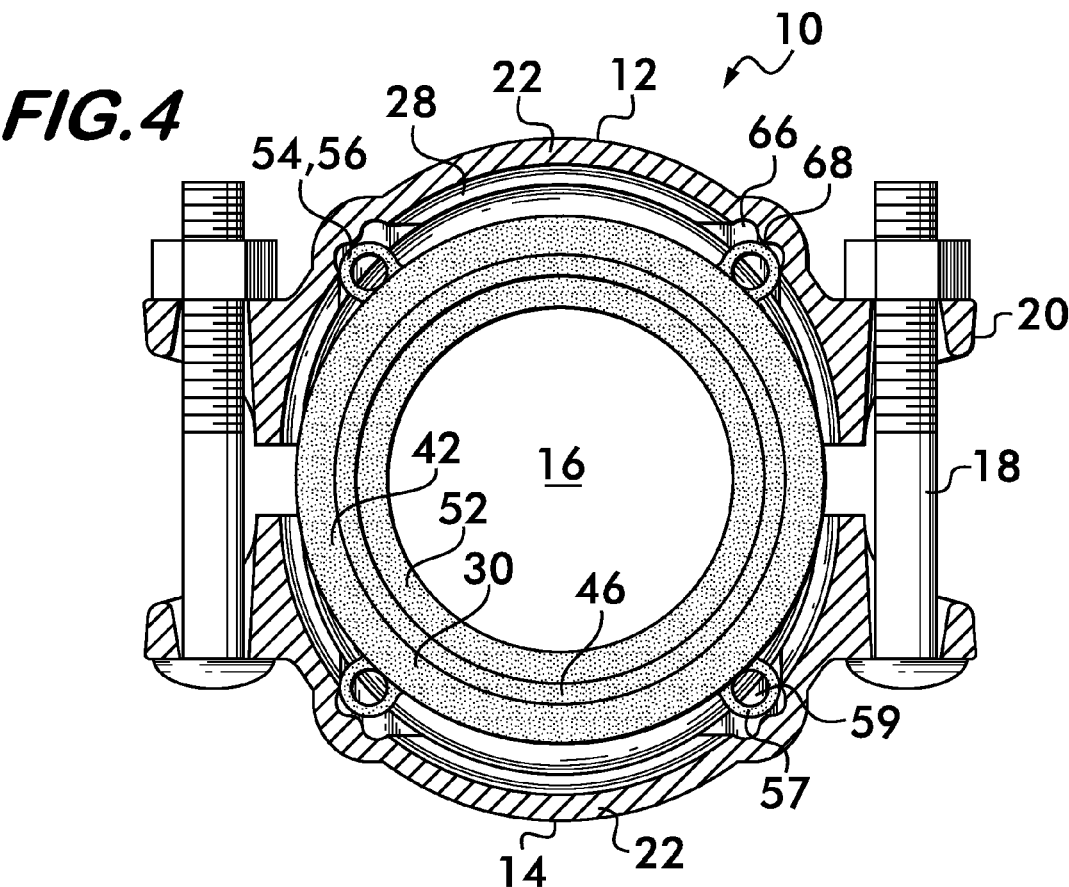
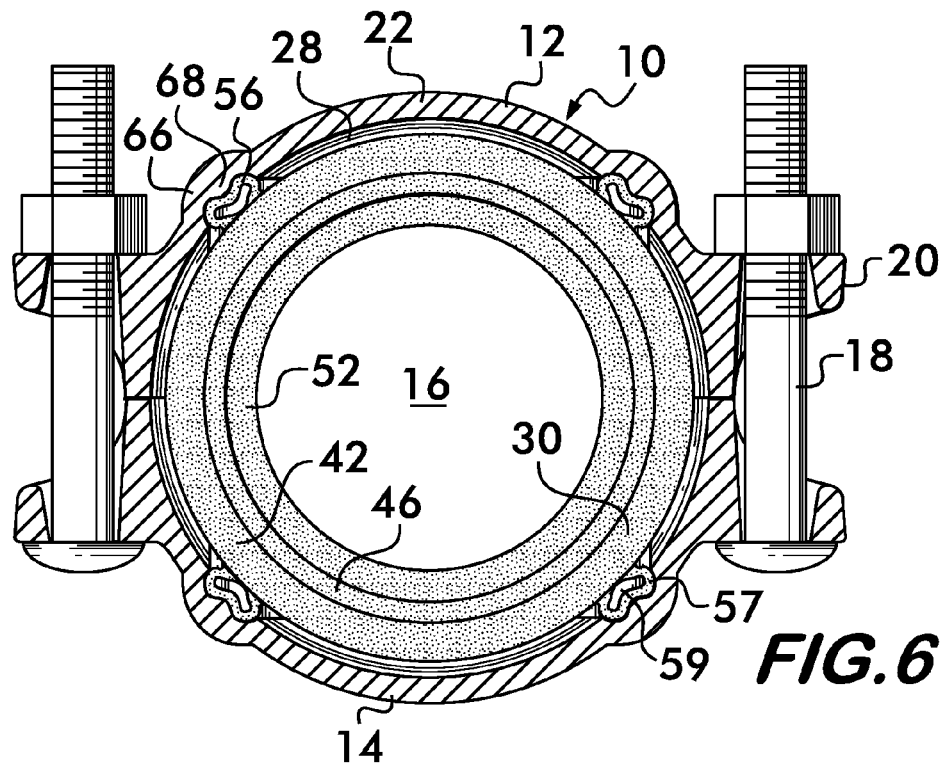

SEAL HAVING PROJECTIONS AND COUPLING HAVING POCKETS

FIELD OF THE INVENTION

This invention relates to couplings for joining pipe elements in end to end relation, and especially to installation ready couplings which do not need to be disassembled prior to installation.

BACKGROUND

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe like form. Pipe elements include pipe stock, pipe fittings such as elbows, caps and tees, as well as fluid control components such as valves, reducers, strainers, restrictors, pressure regulators and the like.

Each mechanical coupling segment comprises a housing having arcuate surfaces which project radially inwardly from the housing and engage the outer surfaces of the pipe elements to be joined. Such pipe elements include plain end, grooved, beaded as well as shouldered configurations. Engagement between the arcuate surfaces and the pipe elements provides mechanical restraint to the joint and ensures that the pipe elements remain coupled even under high internal pressure and external forces. The housings define channels between the arcuate surfaces that receives a gasket or seal, typically an elastomeric ring, which engages the ends of each pipe element and cooperates with the segments to provide a fluid-tight seal. The segments have connection members, typically in the form of lugs which project outwardly from the housings. The lugs are adapted to receive fasteners, such as nuts and bolts, which are adjustably tightenable to draw the segments toward one another.

To ensure a good fit between the couplings and the pipe elements, the arcuate surfaces on prior art couplings have a radius of curvature that is substantially matched to the radius of curvature of the outer surface of the pipe element that it is intended to engage. For couplings used with grooved pipe elements, the radii of curvature of the arcuate surfaces are smaller than the radii of curvature of the outer surfaces of the pipe elements outside of the grooves so that the arcuate surfaces fit within and engage the grooves properly. For couplings used with shouldered or beaded pipe elements, the radii of curvature may be sized to engage the outer diameter of the pipe adjacent to the bead or shoulder.

This geometrical relation between the arcuate surfaces of the couplings and the outer surfaces of the pipe elements in prior art couplings results in a time consuming installation process when mechanical couplings are used. Typically, the coupling is received by the technician with the segments bolted together and the ring seal captured within the segments' channels. The technician first disassembles the coupling by unbolting it, removes the ring seal, lubricates it (if not pre-lubricated) and places it around the ends of the pipe elements to be joined. Installation of the ring seal requires that it be lubricated and frequently stretched to accommodate the pipe elements, an often messy task, as the lubrication makes manual manipulation of the seal difficult. With the ring seal in place on both pipe elements, the segments are then placed one at a time straddling the ends of the pipe elements and capturing the ring seal against them. During placement, the segments engage the seal, the arcuate surfaces are aligned with the grooves, beads or shoulders (when present), the bolts are inserted through the lugs, the nuts are threaded onto the bolts and tightened, drawing the coupling segments toward one another, compressing the seal and engaging the coupling with the pipe.

As evident from the previous description, installation of mechanical pipe couplings according to the prior art requires that the technician typically handle at least seven individual piece parts (and more when the coupling has more than two segments) and must totally disassemble and reassemble the coupling. Significant time, effort and expense would be saved if the technician could install a mechanical pipe coupling without first totally disassembling it and then reassembling it, piece-by-piece.

SUMMARY

The invention concerns a seal for use with mechanical pipe couplings. The seal comprises a back wall extending circumferentially to form a ring. The ring has an outwardly facing circumferential surface. First and second side walls are positioned in spaced apart relation on opposite sides of the ring. The side walls are attached to the back wall and extend substantially radially inwardly therefrom. A first lip is attached to the first sidewall, and a second lip attached to the second sidewall. The lips extend circumferentially around the ring and project toward one another. At least one projection is attached to the outwardly facing circumferential surface. The projection projects outwardly from the surface and comprises a tube surrounding a bore.

The seal may comprise a plurality of such projections, for example, four of the projections. The projections may be positioned in spaced relation around the outwardly facing circumferential surface, for example, at equal angular intervals. In one seal embodiment the projections comprise a tube. Each of the tubes has a longitudinal axis oriented substantially perpendicular to a plane containing the ring.

The invention also concerns a coupling for joining pipe elements in end to end relation. The coupling comprises a plurality of segments attached to one another in end to end relation surrounding a central space. Each of the segments has a back wall and a pair of side walls attached thereto in spaced relation defining a channel. Each of the back walls has a back wall surface facing the central space and extending lengthwise along each of the segments. Each of the segments has a pair of arcuate keys positioned in spaced relation on opposite sides of the channel. Each of the keys extends lengthwise along the segments and projects inwardly toward the central space. A seal is positioned within the central space and is received within the cavities. The seal comprises a ring formed of flexible, resilient material, the ring having an outwardly facing circumferential surface. One or more projections are attached to the outwardly facing circumferential surface. The projections project outwardly from the surface. The projections engage the back wall surface on the segments and support the segments in spaced apart relation to one another.

The coupling further comprises a plurality of connection members positioned at opposite ends of the segments for adjustably connecting the segments to one another. The connection members are adjustably tightenable for drawing the segments toward one another and bringing the keys into engagement with the pipe elements upon deformation of the projections. The coupling may comprise one or more pockets positioned in the back wall of the segments. The pockets receive the projections from the seal. A ridge may be positioned within each of the pockets. The ridges project inwardly toward the central space. The pockets may be positioned in spaced relation along the back walls of the segments.

In another embodiment, each of the arcuate keys subtend an angle of less than 180° and has a radius of curvature greater than the radius of curvature of the outer surface of the pipe elements. The segments are deformable upon adjustable tightening of the connection members so as to substantially conform the curvature of the arcuate keys to the outer surfaces of the pipe elements.

BRIEF DESCRIPTION OF THE DRAWINGS

FIG. 4 is a cross sectional view of the coupling shown in an installation ready configuration;

FIG. 6 is a cross sectional view of the coupling with the coupling segments drawn toward one another and engaging the pipe elements;

DETAILED DESCRIPTION OF EMBODIMENTS

Figure 1:
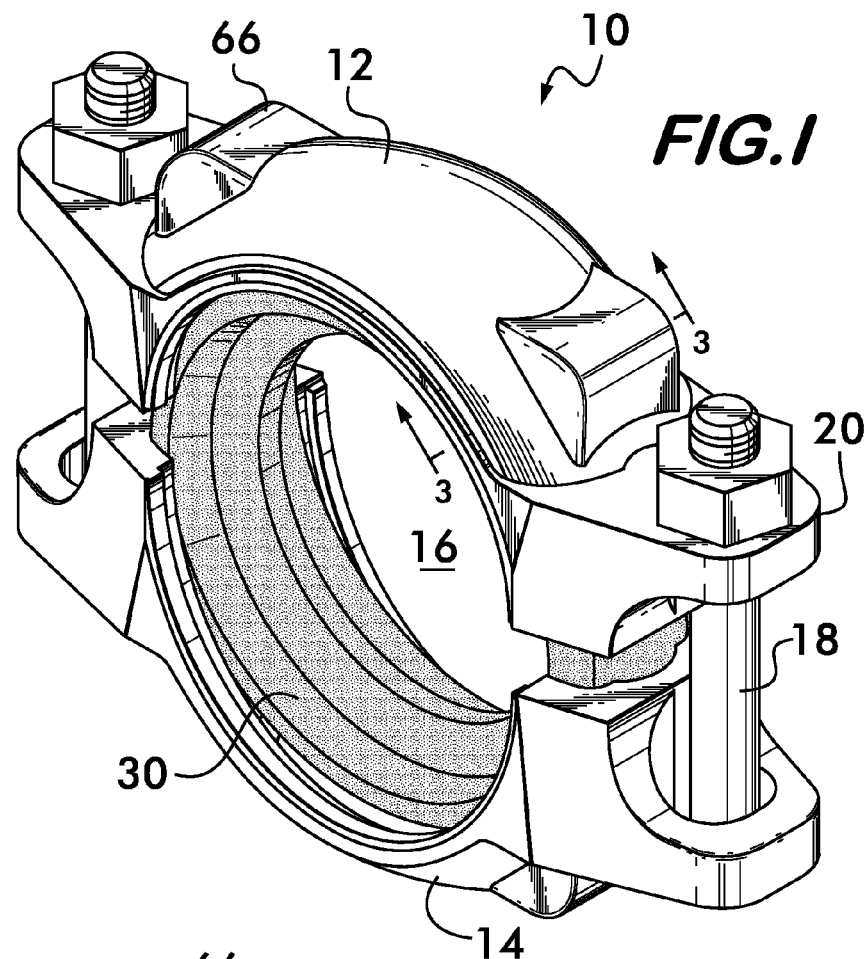
FIG. 1 is an isometric view of a coupling and seal according to the invention.

FIG. 1 shows an example of an installation ready coupling 10 according to the invention. Coupling 10 comprises a plurality of segments, in this example two segments 12 and 14 attached to one another in end to end relation surrounding a central space 16. The segments are attached using connection members comprising adjustably tightenable fasteners 18 received in lugs 20 positioned at the ends of each segment.

Figure 3:
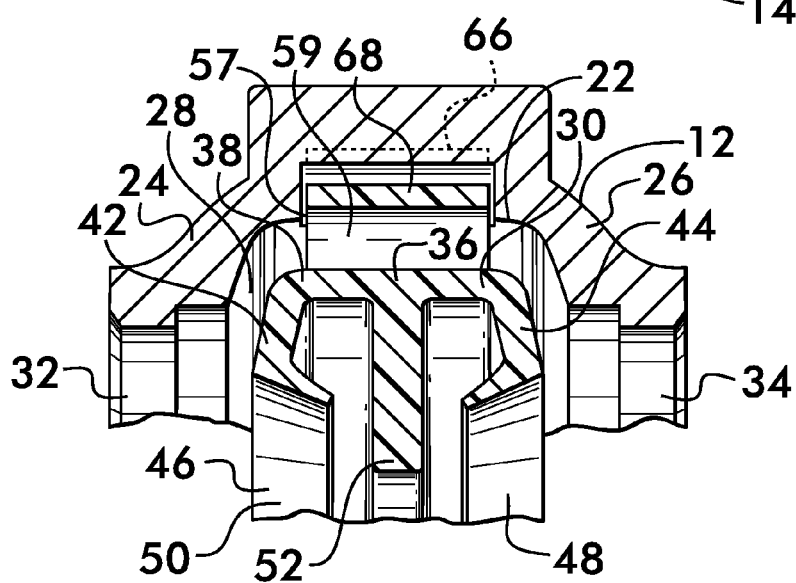
FIG. 3 is a sectional view taken at line 3-3 of FIG. 1.
Figure 2:
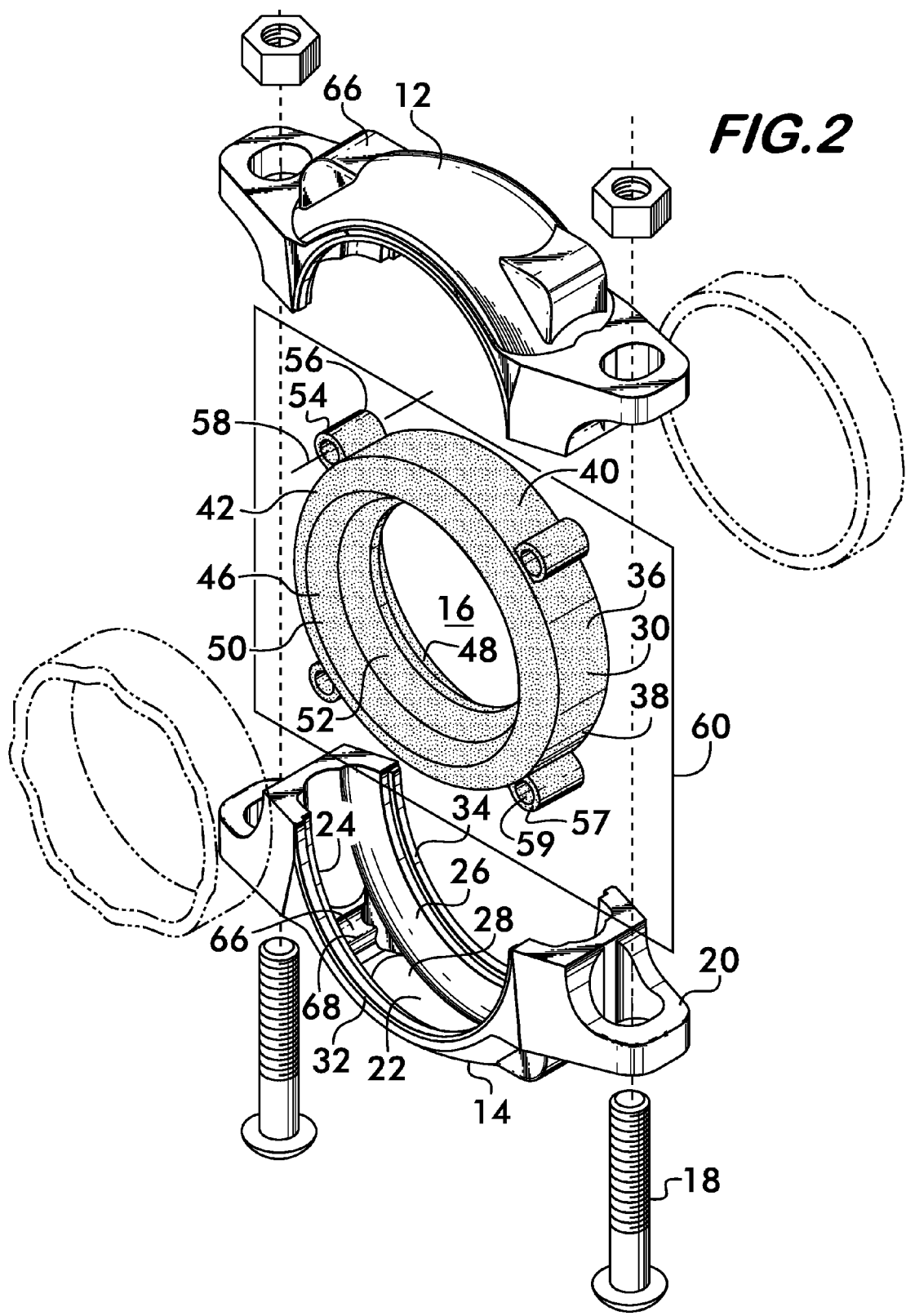
FIG. 2 is an exploded isometric view of the coupling and seal shown in FIG. 1.

As shown in FIGS. 2 and 3, each segment comprises a back wall 22 and side walls 24 and 26. Side walls 24 and 26 are attached to the back wall 22 in spaced relation and define a channel 28. Channels 28 extend lengthwise along the segments 12 and 14 and receive a seal 30 positioned within the central space 16. Each segment also has a pair of arcuate keys 32 and 34 which are positioned in spaced relation on respective side walls 24 and 26. The keys extend lengthwise along the segments 12 and 14 and project radially inwardly toward the central space 16. Keys 32 and 34 engage pipe elements and retain them in end to end relation as described below.

As shown in FIGS. 2 and 3, seal 30 comprises a back wall 36 which extends circumferentially to form a ring 38. Ring 38 has an outwardly facing circumferential surface 40. Two side walls 42 and 44 are attached to back wall 36 in spaced apart relation on opposite sides of the ring 38. The side walls extend circumferentially around ring 38 and project radially inwardly toward the central space 16. Lips 46 and 48 are attached to side walls 42 and 44 respectively. The lips extend circumferentially around the ring and project toward one another. Each lip 46 and 48 has a conical surface 50 facing outwardly from the central space. Conical surfaces 50 engage pipe elements to form a fluid tight seal as described below. Seal 30 may also include a tongue 52 positioned between the side walls 42 and 44 and lips 46 and 48. Tongue 52 may be attached to the back wall 36 and extend circumferentially around the ring 38. The tongue projects radially inwardly toward the central space 16 and serves as a stop to limit pipe engagement with the coupling as described below.

As shown in FIG. 2, one or more projections 54 are attached to the outwardly facing circumferential surface 40. Projections 54 project outwardly from the surface 40 and are positioned in spaced apart relation, for example, there being four projections shown in FIG. 2 spaced at equal angular intervals of 90° around the surface 40. In this example the projections 54 comprise tubes 56 having a sidewall 57 surrounding a bore 59. Each tube has a respective longitudinal axis 58 parallel to bore 59, the axis being oriented substantially perpendicular to a plane 60 containing the ring 38. In this embodiment the tubes 56 have circular cross sections.

Figure 5:
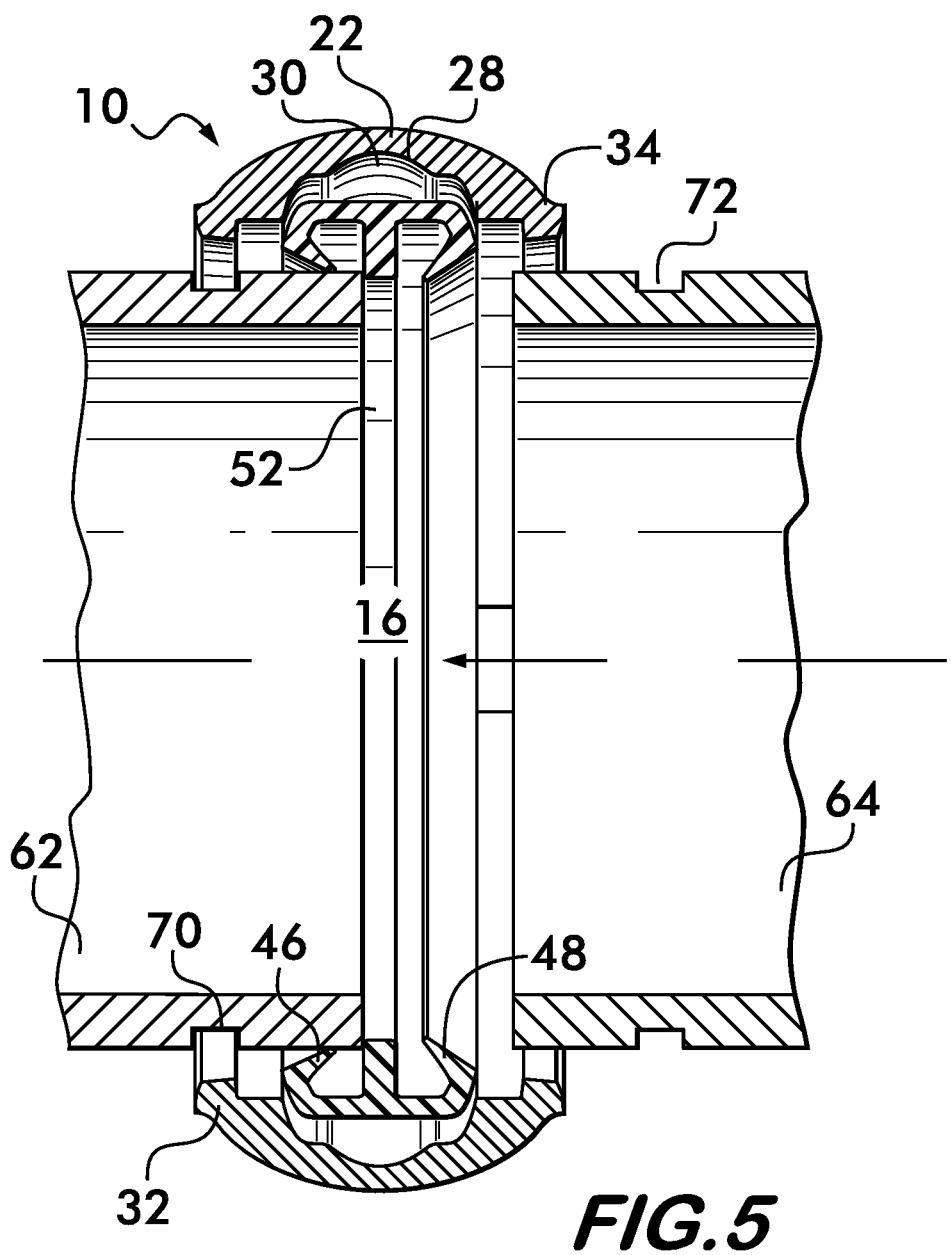
FIG. 5 is a longitudinal cross sectional view illustrating inserting pipe elements into the coupling shown in FIG. 4.

As shown in FIG. 4, the projections 54 engage the back wall 22 of the coupling segments 12 and 14 and serve to support the segments in spaced apart relation, thereby allowing pipe elements 62 and 64 to be inserted into the central space 16 from opposite sides of the coupling 10 as illustrated in FIG. 5. The coupling 10 with the segments 12 and 14 connected in spaced apart relation and supported by the projections 54 is said to be "installation ready" meaning that the pipe elements may be inserted without the need to disassemble the coupling, there being sufficient clearance between the segments 12 and 14 and the pipe elements 62 and 64 provided by the projections 54 to permit insertion. In the embodiment shown in FIG. 4 the projections are received within pockets 66 positioned in the back walls 22 of the segments 12 and 14. The seal projections engage the segment pockets to orient the seal 30 to ensure that each segment is adequately supported and maintained in spaced apart relation with the bolt pads substantially equally spaced apart on opposite sides of each segment. In this example, each segment 12 and 14 is supported by two projections 54 equally spaced along the segments. If this orientation were not maintained it is conceivable that the seal could rotate out of position such that only one projection would be supporting a segment. This may further result in the seal being deformed out of round, which would inhibit insertion of the pipe element, and may adversely affect the sealing capabilities of the joint.

It may be further advantageous to position a ridge 68 in each pocket 66 as shown in FIGS. 2 and 3. Ridges 68 extend parallel to the longitudinal axes 58 of tubes 56 and serve to facilitate controlled deformation of the tubes to permit the fluid tight joint to be formed as shown in FIG. 6. The ridges initiate shell buckling of the tube sidewall 57 into the bore 59 and thereafter occupy the volume previously occupied by the tube to support the segments and help maintain the gasket's round shape and prevent seal failure due to excessive point loads on the seal circumference.

Figure 7:
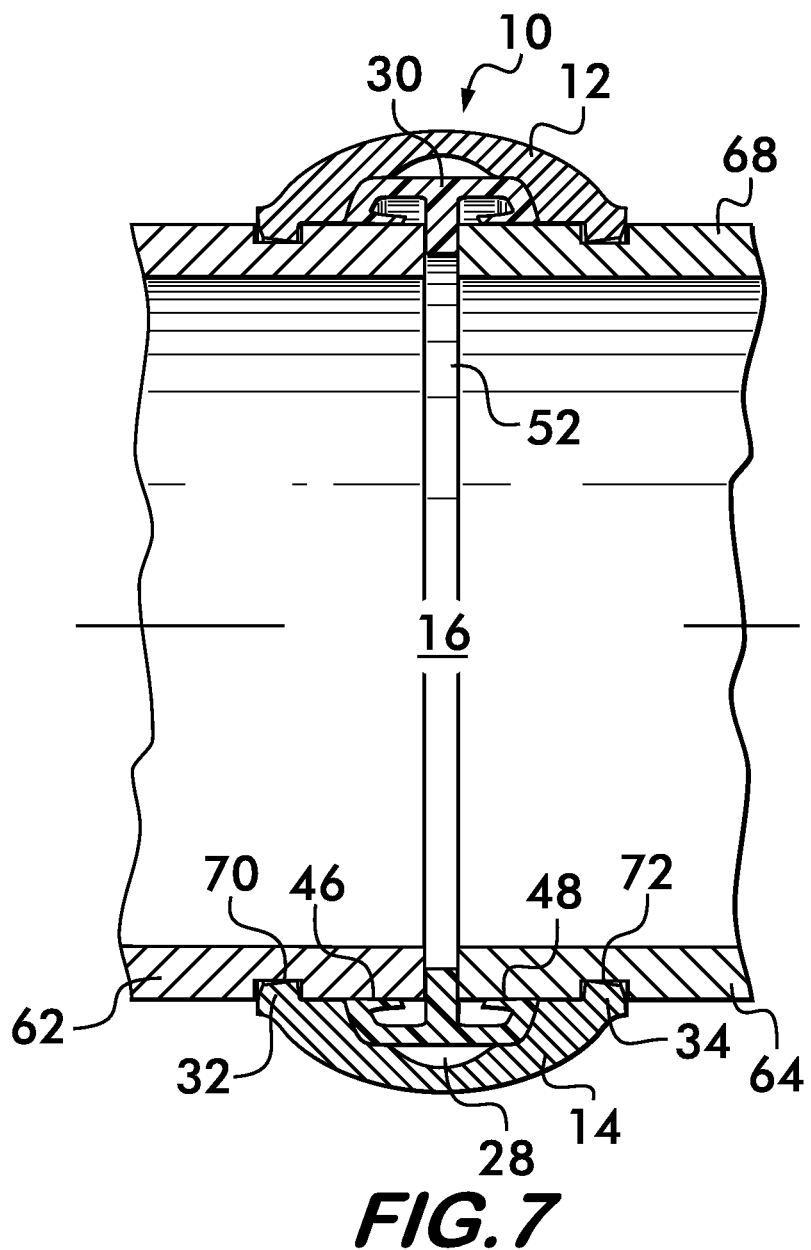
FIG. 7 is a longitudinal sectional view showing the coupling segments drawn toward one another and engaging the pipe elements.

In operation, the coupling 10 is received in the installation ready configuration shown in FIG. 4, with the segments 12 and 14 connected in spaced apart relation by fasteners 18, the segments supported by projections 54 (in the form of tubes 56) extending from seal 30. As shown in FIG. 5, pipe elements 62 and 64 are inserted into the central space 16 from opposite directions. The pipe elements engage lips 46 and 48 on the seal 30 and are stopped upon contact with the tongue 52. Respective circumferential grooves 70 and 72 in the pipe elements 62 and 64 align with respective arcuate keys 32 and 34 when the pipe elements are properly engaged with the coupling 10. Next, as shown in FIG. 6, the fasteners 18 are tightened to draw the segments 12 and 14 toward one another so that the keys 32 and 34 engage the respective grooves 70 and 72 to mechanically couple the pipe elements in end to end relation. Ridges 68 within pockets 66 facilitate deformation of the tubes 56, the tube sidewall 57 collapsing into the bore 59 which it surrounds as shown in FIG. 6 to permit the keys to engage the grooves as shown in FIG. 7 and make drawing the housing together easier due to the buckling of the tubes.

Figure 8:
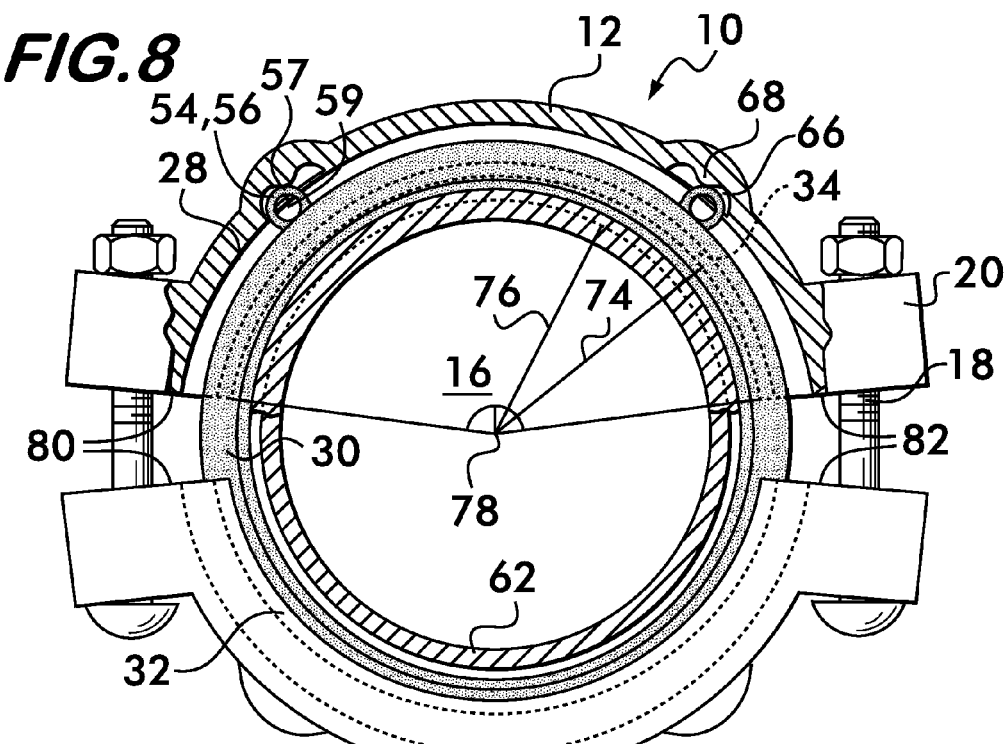
FIGS. 8 and 9 are cross sectional views illustrating an embodiment of a deformable coupling according to the invention.
Figure 9:
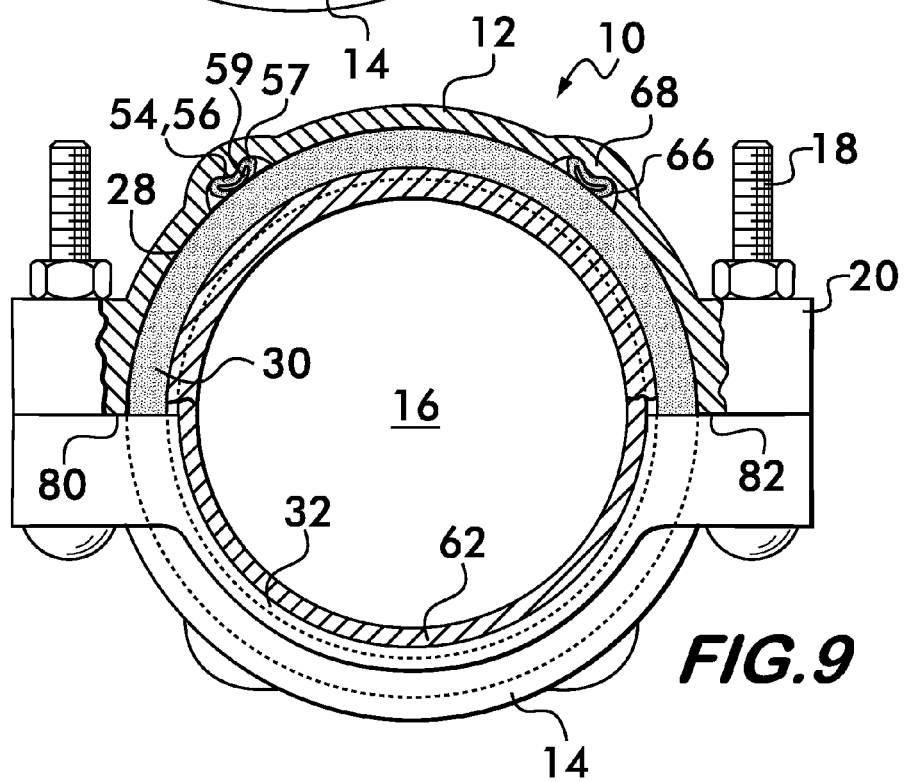

As shown in FIG. 8, to provide sufficient clearance between segments 12 and 14 when they are connected to one another in spaced relation so that the pipe elements 62 and 64 may be inserted into the central space 16 without disassembling the coupling 10 it is advantageous that the radius of curvature 74 of keys 32 and 34 be greater than the radius 76 of the outer surface of the pipe elements which it will engage. It is further advantageous that the angle 78 subtended by the keys 32 and 34 be less than 180°. As shown in FIG. 8, this configuration of the radius 74 and subtended key angle 78 provides clearance between the pipe elements outer surfaces and the ends 80 and 82 of segments 12 and 14. This end clearance permits a closer spacing of the segments while still allowing insertion of the pipe elements which, in turn, allows fasteners 18 to be shorter and thereby yields a practical design. Shorter fasteners also provide a stiffer design which maintains the segment in the same plane as the gasket. When the fasteners are tightened to draw the segments toward one another and effect engagement between the grooves 70 and 72 and keys 32 and 34 (see FIG. 9) the segments deform so as to substantially conform the keys 32 and 34 to the outer surface of the pipe elements as shown in FIG. 9.

What is claimed is:

1. A coupling for joining pipe elements in end to end relation, said coupling comprising:
    a plurality of segments attached to one another in end to end relation surrounding a central space, each of said segments having a back wall and a pair of side walls attached thereto in spaced relation defining a channel, each of said back walls having a back wall surface facing said central space and extending lengthwise along each of said segments, each of said segments having a pair of arcuate keys positioned in spaced relation on opposite sides of said channel, each of said keys extending lengthwise along said segments and projecting inwardly toward said central space;
    a seal positioned within said central space and received within said channels, said seal comprising a ring formed of flexible, resilient material, said ring having an outwardly facing circumferential surface;
    at least one projection attached to said outwardly facing circumferential surface and projecting outwardly therefrom, said at least one projection comprising a tube having a sidewall surrounding a bore, said tube having a longitudinal axis oriented transversely to a plane containing said ring; said at least one projection engaging said back wall surface on one of said segments and supporting said segments in spaced apart relation to one another sufficient to insert said pipe elements into said central space.

2. The coupling according to claim 1, further comprising a plurality of connection members positioned at opposite ends of said segments for adjustably connecting said segments to one another, said connection members being adjustably tightenable for drawing said segments toward one another and bringing said keys into engagement with said pipe elements upon deformation of said at least one projection.

3. The coupling according to claim 2, further comprising at least one pocket positioned in said back wall of one of said segments, said one pocket receiving said projection.

4. The coupling according to claim 3, further comprising a ridge positioned within said at least one pocket, said ridge projecting inwardly toward said central space.

5. The coupling according to claim 2, wherein each of said arcuate keys subtend an angle of less than 180° and has a radius of curvature greater than the radius of curvature of the outer surface of said pipe elements, said segments being deformable upon adjustable tightening of said connection members so as to substantially conform the curvature of said arcuate keys to the outer surfaces of said pipe elements.

6. The coupling according to claim 1, wherein said seal comprises a plurality of said projections.

7. The coupling according to claim 6, wherein said projections are positioned in spaced relation around said outwardly facing circumferential surface.

8. The coupling according to claim 7, wherein said projections are spaced apart at equal angular intervals along said outwardly facing circumferential surface.

9. The coupling according to claim 6, wherein said longitudinal axis of each one of said tubes is oriented substantially perpendicular to said plane containing said ring.

10. The coupling according to claim 9, wherein each one of said tubes has a circular cross section.

11. The coupling according to claim 6, further comprising a plurality of pockets positioned in said back walls of said segments, said pockets receiving said projections.

12. The coupling according to claim 1, wherein said pockets are positioned in spaced relation along said back walls of said segments.

13. The coupling according to claim 11, comprising four of said pockets.

14. The coupling according to claim 11, wherein each of said pockets further comprises a ridge therein, each of said ridges projecting inwardly toward said central space.

15. The coupling according to claim 1, wherein said seal comprises four of said projections.

16. The coupling according to claim 1, wherein said longitudinal axis is oriented substantially perpendicular to said plane containing said ring.

17. The coupling according to claim 16, wherein said tube has a circular cross section.

18. The coupling according to claim 1, wherein said seal further comprises a back wall and first and second side walls positioned in spaced apart relation on opposite sides of said ring, said outwardly facing circumferential surface being positioned on said back wall of said seal, said side walls of said seal extending substantially radially inwardly from said backwall of said seal, a first lip being attached to said first sidewall of said seal, a second lip being attached to said second sidewall of said seal, said lips extending circumferentially around said ring and projecting toward one another.

19. The coupling according to claim 18, wherein said first and second lips each have a conical surface facing outwardly from said ring.

20. The coupling according to claim 18, further comprising a tongue positioned between said first and second side walls, said tongue extending circumferentially around said ring and projecting radially inwardly.

* * * * *